United States Patent
Hammer et al.

(10) Patent No.: US 9,853,891 B2
(45) Date of Patent: Dec. 26, 2017

(54) SYSTEM AND METHOD FOR FACILITATING COMMUNICATION

(75) Inventors: Michael P. Hammer, Reston, VA (US); Ashish Dalela, Bangalore (IN); Monique J. Morrow, Zurich (CH); Peter C. Tomsu, Leitzersdorf (AT)

(73) Assignee: Cisco Technology, Inc., San Jose, CA (US)

(*) Notice: Subject to any disclaimer, the term of this patent is extended or adjusted under 35 U.S.C. 154(b) by 373 days.

(21) Appl. No.: 13/410,525

(22) Filed: Mar. 2, 2012

(65) Prior Publication Data

US 2013/0230053 A1 Sep. 5, 2013

(51) Int. Cl.
*H04L 12/741* (2013.01)
*H04L 29/12* (2006.01)
*H04L 29/06* (2006.01)

(52) U.S. Cl.
CPC ........ *H04L 45/54* (2013.01); *H04L 29/12028* (2013.01); *H04L 61/103* (2013.01); *H04L 63/1441* (2013.01)

(58) Field of Classification Search
CPC ................. H04L 1/0016; H04L 45/021; H04L 29/12028; H04L 61/103; H04L 45/54; H04L 63/1441; H04W 40/00
USPC ......................................................... 370/401
See application file for complete search history.

(56) References Cited

U.S. PATENT DOCUMENTS

| | | | |
|---|---|---|---|
| 7,245,617 B2 | 7/2007 | Nakagawa | 370/389 |
| 7,434,254 B1* | 10/2008 | Foschiano | H04L 29/12028 713/153 |
| 7,551,559 B1* | 6/2009 | Jonnala et al. | 370/230 |
| 8,089,967 B2 | 1/2012 | Hazard | 370/395.31 |
| 8,099,512 B2 | 1/2012 | Katis et al. | 709/231 |
| 8,108,455 B2 | 1/2012 | Yeager et al. | 709/202 |
| 8,117,338 B2 | 2/2012 | Ould-Brahim | 709/242 |
| 2004/0095943 A1* | 5/2004 | Korotin | H04L 29/12009 370/401 |
| 2004/0203740 A1* | 10/2004 | Won | H04L 12/24 455/426.1 |
| 2005/0083936 A1* | 4/2005 | Ma | 370/392 |
| 2009/0172151 A1* | 7/2009 | Davis | H04L 61/2046 709/224 |
| 2010/0002577 A1* | 1/2010 | Moreno et al. | 370/221 |
| 2012/0014386 A1* | 1/2012 | Xiong | H04L 61/103 370/392 |
| 2012/0014387 A1* | 1/2012 | Dunbar | H04L 12/4625 370/395.53 |
| 2012/0033668 A1 | 2/2012 | Humphries | 370/390 |

(Continued)

OTHER PUBLICATIONS

Cisco "How LAN switches work" Aug. 1, 2007 Document ID: 10607 (14 pages).*

(Continued)

*Primary Examiner* — Afshawn Towfighi
*Assistant Examiner* — Mewale Ambaye
(74) *Attorney, Agent, or Firm* — Baker Botts L.L.P.

(57) ABSTRACT

According to one embodiment, a system includes one or more memory units for storing an Address Resolution Protocol (ARP) table. The system further includes one or more processors. The processors receive, from a routing protocol, an Internet Protocol (IP)-Media Access Control (MAC) address pair for a first host computer. The processors further populate the ARP table with the IP-MAC address pair for the first host computer.

12 Claims, 3 Drawing Sheets

(56) References Cited

U.S. PATENT DOCUMENTS

2012/0327836 A1* 12/2012 Narayanasamy ............. 370/312
2014/0119354 A1* 5/2014 Verma ................. H04L 12/4633
                                                        370/338
2014/0226665 A1* 8/2014 Ido ........................ H04L 45/745
                                                        370/392

OTHER PUBLICATIONS

How LAN Switches Work, Document ID: 10607 (14 pgs), Aug. 1, 2007.

* cited by examiner

SYSTEM AND METHOD FOR FACILITATING COMMUNICATION

TECHNICAL FIELD

This disclosure relates generally to the field of communication and more specifically to a system and method for facilitating communication based on a routing protocol.

BACKGROUND

In order for a first host computer to communicate with a second host computer over a network using Internet Protocol (IP), the first host computer generally utilizes the second host IP address and Media Access Control (MAC) address. Traditional approaches for a first host computer to determine a second host computer's MAC address involve an Address Resolution Protocol (ARP) query that is responded to by a core switch or the second host computer. Furthermore, traditional approaches for a first host computer to determine a second host computer's MAC address may also involve an ARP query that is responded to by an access switch that "snoops" on host-to-host conversations.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE DRAWINGS

Figure 1A:
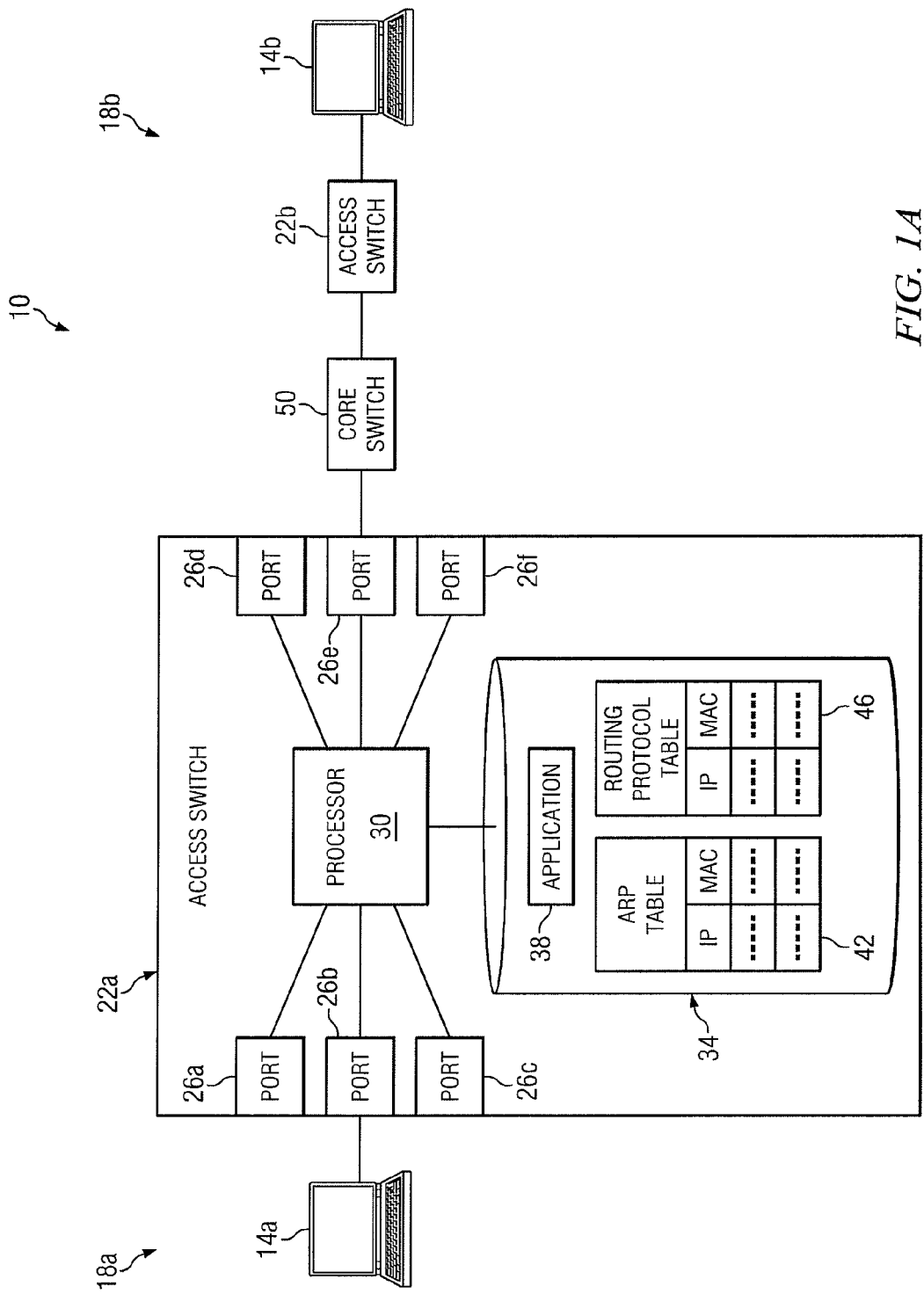
FIG. 1A illustrates a system that facilitates communication between host computers, according to an example embodiment.
Figure 1B:
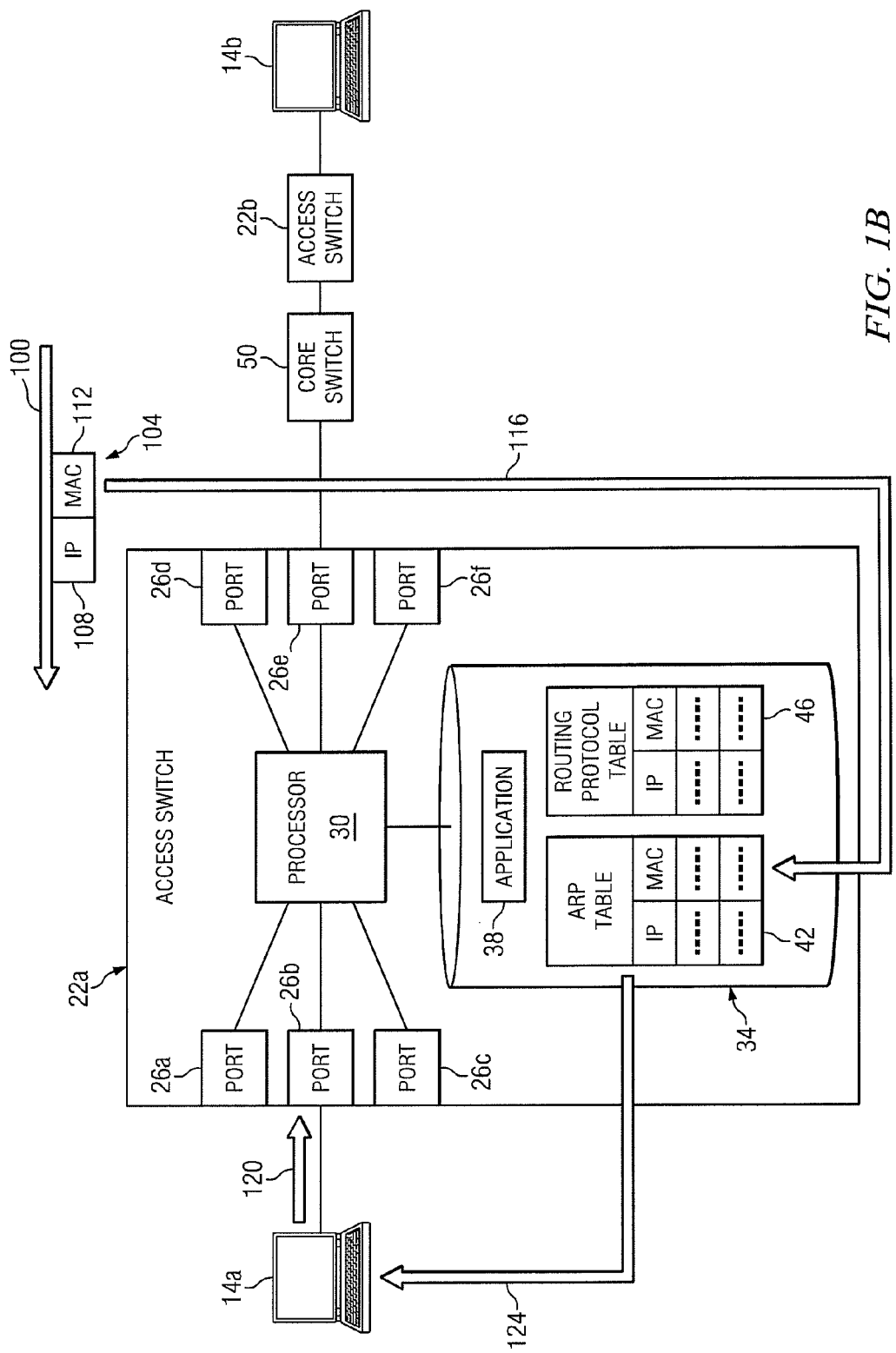
FIG. 1B illustrates an example embodiment of operations of the system of FIG. 1A.
Figure 2:
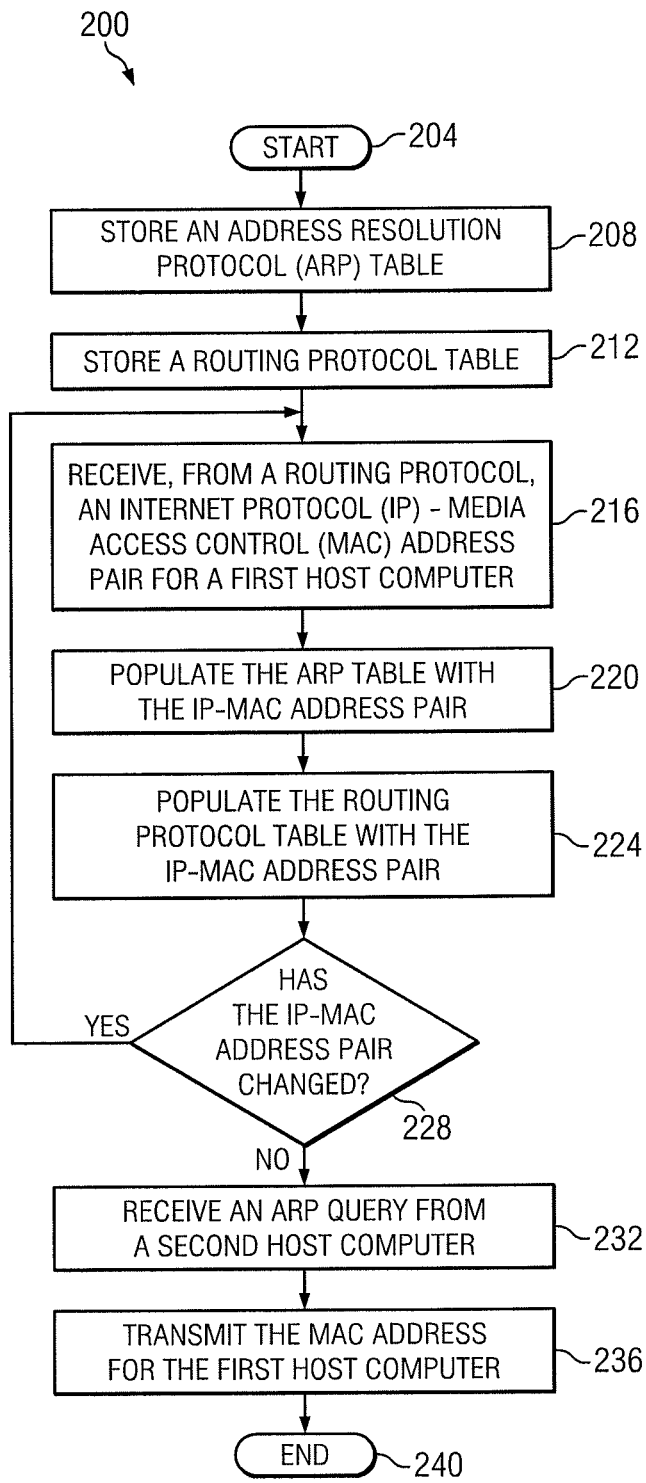
FIG. 2 illustrates a method for facilitating communications between host computers, according to an example embodiment.

Embodiments of the present disclosure are best understood by referring to FIGS. 1A through 2 of the drawings, like numerals being used for like and corresponding parts of the various drawings.

FIG. 1A illustrates a system 10 that facilitates communication between host computers, according to an example embodiment. System 10 includes an access switch 22 that participates in a routing protocol. In doing so, the access switch 22 receives an Internet Protocol (IP)-Media Access Control (MAC) address pair for a first host computer from the routing protocol. The access switch 22 further populates an Address Resolution Protocol (ARP) table with the IP-MAC address pair. Therefore, when the access switch 22 receives an ARP query requesting the MAC address for the first host computer, the access switch 22 may transmit the MAC address stored in the ARP table in response to the ARP query. As such, the second host computer may communicate with the first host computer using the received MAC address.

An IP address represents a numerical label assigned to each device (such as a host computer) participating in a network that uses IP for communication. As an example, an IP address may include 192.168.0.55. A MAC address represents a unique identifier assigned to a network interface for communication on a physical network segment of a network. As an example, a MAC address may include 00:eb:24:b2:05:ac. An IP-MAC address pair represents a combination of a device's IP address and MAC address. A host computer may use the IP-MAC pair of another host computer in order to communicate with that computer.

A routing protocol represents a protocol that allows switches to share network topology information between themselves. Such topology information includes information for how to forward a packet to a particular location. Examples of a routing protocol include IGRP (Interior Gateway Routing Protocol), EIGRP (Enhanced Interior Gateway Routing Protocol), OSPF (Open Shortest Path First), RIP (Routing Information Protocol), and IS-IS (Intermediate System to Intermediate System). A routing protocol knows which IP address and/or MAC address is at which location (e.g., which location a host computer is currently at). In particular embodiments, when a routing protocol is run in system 10, the routing protocol will discover the location and addresses of all host computers in system 10.

In order for a first host computer to communicate with a second host computer, the first host computer generally utilizes the second host computer's IP address and MAC address. When the first host computer is connected to a different network than the second host computer (for example, when the first host computer is connected to a first virtual local area network (VLAN) and the second host computer is connected to a second VLAN) the first host computer traditionally determines the second host computer's MAC address by transmitting an ARP query requesting that MAC address. For example, the first host computer sends the ARP query to a core switch (which includes a gateway) that connects the two different networks together. If the core switch knows the second host computer's MAC address, the core switch will transmit a response that includes the second host computer's MAC address. On the other hand, if the core switch does not know the second host computer's MAC address, the core switch will forward the ARP query to the second host computer, which will then transmit a response that includes the second host computer's MAC address. Therefore, a response to a first host computer's ARP query (which includes the second host computer's MAC address) is traditionally transmitted by either a core switch or the second host computer.

Unfortunately, such a traditional approach can create problems when there are a large number of host computers, such as in a data center. For example, in a data center, there may be approximately one million host computers, ten thousand access switches connected directly to the host computers, and ten core switches connecting the access switches to each other. As such, in the traditional approach, ARP queries from the one million host computers must typically flow through the ten core switches, which can create a bottleneck. Particular attempts to solve this bottleneck problem have included utilizing a distributed hash table (DHT) or utilizing ARP tables at access switches (e.g., ARP proxies). Unfortunately, with regard to ARP proxies, the access switches typically populate the ARP table by "snooping" on host-to-host conversations. Such a method of populating the ARP table at an access switch, however, may be deficient.

In particular embodiments, system 10 of FIG. 1A may facilitate communications between host computers in a manner that may provide various advantages. For example, in order to populate an ARP table, an access switch may receive an IP-MAC address pair for a host computer from a routing protocol. As such, the access switch may not have to "snoop" on host-to-host conversations. As another example, when an ARP query is received from a host computer, the access switch may respond to the ARP query, using the IP-MAC address pair received from the routing protocol. As such, an ARP query may not need to be transmitted all the way to a core switch, thereby reducing the bottleneck effect and providing for a more evenly distributed address resolution.

System 10 includes host computers 14, networks 18, access switches 22, and core switch 50, according to the illustrated embodiment. Host computer 14 represents any components that may communicate (such as with another host computer 14) over one or more networks. Host computer 14 may include a network server, any remote server, a mainframe, a work station, a web server, a file server, a personal computer, a laptop, a wireless or cellular telephone, an electronic notebook, a personal digital assistant, or any other device operable to communicate over one or more networks. The functions of host computer 14 may be performed by any combination of one or more servers or other components at one or more locations. In the embodiment where the module is a server, the server may be a private server, and the server may be a virtual or physical server. The server may include one or more servers at the same or remote locations. Also host computer 14 may include any component that functions as a server.

System 10 includes two host computers (host computer 14a and host computer 14b) that may communicate with each other, according to the illustrated embodiment. Furthermore, host computer 14a may be located on a different network (e.g., network 18a) than host computer 14b (e.g., network 18b). As such, in order for host computer 14a to communicate with host computer 14b, host computer 14a may need to transmit an ARP query requesting the MAC address of host computer 14b.

Network 18 represents any network operable to facilitate communication between the components of system 10, such as host computers 14, access switches 22, and core switch 50. Network 18 may include any interconnecting system capable of transmitting audio, video, signals, data, messages, or any combination of the preceding. Network 18 may include all or a portion of a public or private data network, a local area network (LAN), a metropolitan area network (MAN), a local, regional, or global communication or computer network, such as the Internet, a wireline or wireless network, an enterprise intranet, or any other communication link, including combinations thereof, operable to facilitate communication between the components.

System 10 includes two networks 18 (e.g., network 18a and network 18b), according to the illustrated embodiment. As is discussed above, network 18a is different from network 18b. For example, if network 18a is a LAN, network 18b may be a different LAN (or a public or private data network, a MAN, or any other communication link that is different from that of network 18a). As another example, network 18a may use a different communication protocol than network 18b. Because networks 18a and 18b are different, a core switch (such as core switch 50) may be used to connect network 18a and network 18b. Furthermore, because networks 18a and 18b are different, host computer 18a may need to transmit an ARP query to access switch 22a and/or core switch 50, in order to receive the MAC address of host computer 14b.

Access switch 22 represents any components that switch packets received from host computers 14 in order to facilitate communication. Access switch 22 includes multiple ports 26, a processor 30, and a memory 34. Ports 26 are each coupled to processor 30 and a component of system 10 (such as a host computer 14, a core switch 50, or any other component of system 10). In operation, a first port 26 (such as port 26b) receives a packet from a first component of system 10 (such as host computer 14a) and communicates the packet to processor 30 for switching to a second port 26 (such as port 26e), which communicates the packet to a second component of system 10 (such as core switch 50). Reference to a packet can include a packet, datagram, frame, or other unit of data, where appropriate. In particular embodiments, access switch 22 includes an Ethernet switch. In particular embodiments, access switch 22 can switch packets at or near wire speed. In particular embodiments, access switch 22 may connect network segments of networks 18 together. In particular embodiments, access switch 22 may be a software based access switch, such as a virtual machine switch. System 10 includes two access switches 22 (e.g., access switch 22a and access switch 22b), according to the illustrated embodiment. Access switch 22a is connected to host computer 14a and access switch 22b is connected to host computer 14b. As such, access switch 22a may respond to an ARP query from host computer 14a and access switch 22b may respond to an ARP query from host computer 14b.

Processor 30 communicatively couples ports 26 and memory 34, and controls the operation and administration of access switch 22 by processing information received from ports 26 and memory 34. Processor 30 includes any hardware and/or software that operates to control and process information. For example, processor 30 executes access switch management application 38 to control the operation of access switch 22. As another example, processor 30 switches packets received from ports 26. Processor 30 may be a programmable logic device, a microcontroller, a microprocessor, any processing device, or any combination of the preceding.

Memory 34 stores, either permanently or temporarily, data, operational software or any other information for processor 30. Memory 34 includes any one or a combination of volatile or non-volatile local or remote devices suitable for storing information. For example, memory 34 may include random access memory (RAM), read only memory (ROM), magnetic storage devices, optical storage devices, or any other information storage device or a combination of these devices. In particular embodiments, memory 34 may be a tangible storage medium. While illustrated as including particular modules, memory 34 may include any information for use in the operation of access switch 22.

Memory 34 includes access switch management application 38, ARP table 42, and routing protocol table 46, according to the illustrated embodiment. Access switch management application 38 represents any suitable set of instructions, logic, or code embodied in a computer-readable storage medium and operable to facilitate the operation of access switch 22.

ARP table 42 represents any information that maps an IP address to a MAC address. For example, as is discussed above, in order for host computer 14a to communicate with host computer 14b, host computer 14a generally utilizes the IP address and the MAC address of host computer 14b. In such an example, ARP table 42 maps the IP address of host computer 14b to the MAC address of host computer 14b. Therefore, when access switch 22a receives an ARP query from host computer 14a requesting the MAC address of host computer 14b, processor 30 of access switch 22a may utilize the mapping in ARP table 42 in order to determine the MAC address of host computer 14b and respond to the ARP query. As is discussed in further detail below, the IP-MAC address pair of host computer 14*b* may be populated in ARP table 42 from the routing protocol that access switch 22 participates in.

Routing protocol table 46 includes network topology information of the networks 18 of system 10. For example, routing protocol table 46 includes all the information that is discovered when the routing protocol is run in system 10. According to the illustrated embodiment, since the routing protocol of system 10 discovers the location and addresses of all host computers 14, and further because the routing protocol carries the IP-MAC address pair for each of the host computers 14, routing protocol table 46 includes a mapping of an IP address of a host computer (such as host computer 14*b*) to the MAC address of that host computer. In particular embodiments, routing protocol table 46 is populated from the routing protocol.

Although ARP table 42 and routing protocol table 46 have been discussed above as being stored in the same memory 34, in particular embodiments, ARP table 42 and routing protocol table 46 may be stored in different memories 34. For example, access switch 22*a* may include a control plane memory 34 that stores routing protocol table 46, and a different memory 34 that stores ARP table 42.

Core switch 50 represents any components that facilitate communications between host computers 14 by joining networks 18 together. Similar to access switch 22, core switch 50 may include multiple ports, a processor, and a memory. Furthermore, core switch 50 may also include a gateway that may interface networks 18 together. For example, the gateway may interface network 18*a* to network 18*b*, allowing host computer 14*a* to communicate with host computer 14*b* despite being located in different networks 18. Although core switch 50 has been described as being similar to access switch 22, core switch 50 may connect two access switches 22 together (e.g., such as by connecting access switch 22*a* to access switch 22*b*), while access switches 22 may be directly connected to the host computers 14 (e.g., access switch 22*a* is directly connected to host computer 14*a*).

Although FIG. 1 has been illustrated as including two host computers 14, two networks 18, two access switches 22, and one core switch 50, in particular embodiments, system 10 may include any suitable number of host computers 14, any suitable number of networks 18, any suitable number of access switches 22, and/or any suitable number of core switches 50. For example, as is discussed above, system 10 may include a data center where there are, for example, one million host computers, ten thousand access switches, and ten core switches.

Modifications, additions, or omissions may be made to system 10 without departing from the scope of the invention. The components of system 10 may be integrated or separated. Moreover, the operations of system 10 may be performed by more, fewer, or other components. For example, the operations of processor 30 may be performed by more than one processor.

FIG. 1B illustrates an example embodiment of operations of system 10 of FIG. 1A. Access switch 22 participates in routing protocol 100, according to the illustrated embodiment. Routing protocol 100 may include any routing protocol that carries IP-MAC address pairs. For example, routing protocol 100 may include IS-IS. In particular embodiments, routing protocol 100 may include a routing protocol that traditionally does not carry IP-MAC address pairs, but which has been modified to carry IP-MAC address pairs.

Routing protocol 100 carries an IP-MAC address pair 104 for host computer 14*b*, according to the illustrated embodiment. IP-MAC address pair 104 may represent the IP address 108 and the MAC address 112 of host computer 14*b*. Therefore, because access switch 22*a* participates in routing protocol 100, access switch 22*a* receives IP-MAC address pair 104 from routing protocol 100. When access switch 22*a* receives IP-MAC address pair 104 from routing protocol 100, access switch 22*a* populates ARP table 42 with IP-MAC address pair 104, as is seen by population arrow 116. In response to ARP table 42 being populated with IP-MAC address pair 104, ARP table 42 may now map IP address 108 of host computer 14*b* to MAC address 112 of host computer 14*b*.

In particular embodiments, not only may access switch 22*a* populate ARP table 42 with IP-MAC address pair 104, but access switch 22*a* may also populate routing protocol table 46 with IP-MAC address pair 104, thereby allowing access switch 22*a* to develop the topology information of system 10. Although FIG. 1B illustrates ARP table 46 being populated with IP-MAC address pair 104 directly from routing protocol 100, in particular embodiments, access switch 22*a* may retrieve IP-MAC address pair 104 from routing protocol table 46, and populate ARP table 42 using the IP-MAC address pair 104 from routing protocol table 46.

In addition to populating ARP table 42 with IP-MAC address pair 104 from routing protocol 100, in particular embodiments, access switch 22 may further re-populate ARP table 42 with an updated version of IP-MAC address pair 104. For example, if the IP address 108 and/or the MAC address 112 of host computer 14*b* changes, routing protocol 100 may carry the updated version of IP address 108 and MAC address 112 as an updated version of IP-MAC address pair 104. As such, access switch 22 may update ARP table 42 using the updated version of IP-MAC address pair 104.

Once ARP table 42 has been populated with IP-MAC address pair 104 for host computer 14*b*, access switch 22*a* may begin to respond to ARP queries that request the MAC address 112 of host computer 14*b*. For example, as is discussed above, in order for host computer 14*a* to communicate with host computer 14*b*, host computer 14*a* may need host computer 14*b*'s MAC address 112. In order to discover host computer 14*b*'s MAC address 112, host computer 14*a* may transmit ARP query 120. In particular embodiments, ARP query 120 may include the IP address of host computer 14*b*.

Upon receiving ARP query 120 from host computer 14*a*, switch 22*a* may respond to ARP query 120. For example, using ARP query 120 (and the IP address included in ARP query 120), access switch 22*a* may access ARP table 42 in order to determine MAC address 112 of host computer 14*b*. Upon determining MAC address 112, access switch 22*a* may provide response 124 (which includes MAC address 112 of host computer 14*b*) to host computer 14*a*. Therefore, host computer 14*a* may now communicate with host computer 14*b* using MAC address 112 included in response 124.

Although FIG. 1B illustrates routing protocol 100 as including an IP-MAC address pair 104 for only host computer 14*b*, in particular embodiments, routing protocol 100 may include an IP-MAC address pair 104 for any suitable number of host computers 14 (or any other device) in system 10. For example, in particular embodiments, routing protocol 100 may include an IP-MAC address pair 104 for every host computer 14 (or other device) in system 10. In particular embodiments, in addition to including the IP-MAC address pair 104 for host computer 14*b*, routing protocol 100 may further include information regarding the port 26 that access switch 22a may use to transmit packets to host computer 14b.

In particular embodiments, system 10 may utilize segmentation so that routing protocol 100 may only provide access switch 22 with the IP-MAC address pairs 104 for host computers 14 on the same segment of network 18. For example, if access switch 22 does not participate in a particular segment of network 18, access switch 22 may not receive (or even see) any IP-MAC address pairs 104 for any host computers 14 on that segment. In particular embodiments, any suitable type of segmentation may be utilized in system 10 in order to restrict the number of IP-MAC address pairs 104 received by an access switch 22. In particular embodiments, this may reduce the amount of IP-MAC pairs 104 stored in ARP table 46 of an access switch 22.

FIG. 2 illustrates a method 200 for facilitating communications between host computers, according to an example embodiment. According to the example embodiment, one or more steps of method 200 may be performed by an access switch 22 (e.g., access switch 22a and/or access switch 22b).

The method begins at step 204. At step 208, an ARP table is stored. For example, the ARP table may be stored in memory 34 of access switch 22a. At step 212, a routing protocol table is stored. For example, the routing protocol table may be stored in memory 34 of access switch 22a.

At step 216, an IP-MAC address pair for a first host computer is received from a routing protocol. For example, access switch 22a may receive the IP-MAC address pair from a routing protocol that carries IP-MAC address pairs, such as IS-IS.

At step 220, the ARP table is populated with the IP-MAC address pair. For example, access switch 22a may store the IP-MAC address pair received from the routing protocol in the ARP table stored in the memory 34 of access switch 22a.

At step 224, the routing protocol table is populated with the IP-MAC address pair. For example, access switch 22a may store the IP-MAC address pair received from the routing protocol in the routing protocol table stored in the memory 34 of access switch 22a.

At step 228, it is determined whether the IP-MAC address pair for a first host computer has changed. In particular embodiments, the IP-MAC address pair for a first computer may change for any reason, such as if the host computer has moved locations. If the IP-MAC pair has changed, steps 216-228 may be repeated for the updated IP-MAC address pair. On the other hand, if the IP-MAC address pair has not changed, the method may move to step 232.

At step 232, an ARP query is received from a second host computer. The ARP query may include a request for the MAC address of the first host computer. For example, the second host computer may need the MAC address of the first host computer in order to communicate with the first host computer.

At step 236, the MAC address for the first host computer is transmitted. The MAC address for the first host computer may be transmitted based on the ARP table. For example, in response to the ARP query received from the second host computer, access switch 22a may search for and retrieve the MAC address from the ARP table, and may transmit the MAC address to the second host computer. Once the MAC address for the first host computer has been transmitted, the method moves to step 240, where the method ends.

Modifications, additions, or omissions may be made to method 200. Additionally, one or more steps in method 200 in FIG. 2 may be performed in parallel or in any suitable order.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system comprising: an access switch comprising:
one or more memory units configured to store an Address Resolution Protocol (ARP) table and a routing protocol table; and
one or more processors operably coupled to the one or more memory units, wherein the one or more memory units store instructions that configure the one or more processors to:
receive, from the routing protocol table, an Internet Protocol (IP)-Media Access Control (MAC) address pair for a first host computer, the first host computer being a different component from the access switch; and
populate the ARP table with the IP-MAC address pair for the first host computer;
wherein the routing protocol comprises a protocol that allows switches to share network topology information between themselves;
wherein the one or more processors are further configured to:
receive an ARP query from a second host computer, the ARP query requesting the MAC address for the first host computer, the second host computer connected to the access switch; and
based on the ARP table, transmit the MAC address for the first host computer to the second host computer;
wherein the routing protocol comprises one of Intermediate System to Intermediate System (IS-IS) routing protocol, Interior Gateway Routing Protocol (IGRP), Enhanced Interior Gateway Routing Protocol (EIGRP), OpenShortest Path FIRST (OSPF), and Routing Information Protocol (RIP); and
wherein the one or more processors only receive IP-MAC address pairs, from the routing protocol, for one or more host computers that are coupled to a particular subset of network segments.

2. The system of claim 1, wherein the one or more processors are further configured to populate the routing protocol table stored in the one or more memory units with the IP-MAC address pair for the first host computer.

3. The system of claim 1, wherein the system comprises a second access switch connected to the first host computer.

4. The system of claim 1, wherein the one Or more processors are further configured to:
receive, from the routing protocol table, an updated IP-MAC address pair for the first host computer; and
populate the ARP table with the updated IP-MAC address pair for the first host computer.

5. A method comprising:
storing, by one or more memory units of an access switch coupled to one or more processors of the access switch, an Address Resolution Protocol (ARP) table and a routing protocol table;
receiving, by the one Or more processors and from Ran the routing protocol table, an Internet Protocol (IP)-Media Access Control (MAC) address pair for a first host computer, the first host computer being a different component from the access switch; and populating, by the one or more processors, the ARP table with the IP-MAC address pair for the first host computer;

wherein a routing protocol comprises a protocol that allows switches to share network topology information between themselves; and further comprising:

receiving, by the one or more processors, an ARP query from a second host computer, the ARP query requesting the MAC address for the first host computer, the second host computer connected to the access switch; and based on the ARP table, transmitting, by the one or more processors, the MAC address for the first host computer to the second host computer; wherein the routine protocol comprises one of Intermediate System to Intermediate System (IS-IS) routing protocol, Interior Gateway Routing Protocol (TGRP) Enhanced Interior Gateway Routing Protocol (EI-GRP), Open Shortest Path First (OSPF), and Routing Information Protocol (RIP); and wherein the one or more processors only receive IP-MAC address pairs, from the routine protocol, for one or more host computers that are coupled to a particular subset of network segments.

6. The method of claim 5, further comprising populating, by the one or more processors, the routing protocol table stored in the one or more memory units with the IP-MAC address pair for the first host computer.

7. The method of claim 5, wherein the second host computer is connected to a second access switch.

8. The method of claim 5, further comprising:
receiving, by the one or more processors and from the routing protocol table, an updated IP-MAC address pair for the first host computer; and
populating, by the one or more processors, the ARP table with the updated IP-MAC address pair for the first host computer.

9. Logic encoded on one or more non-transitory computer-readable media for execution and when executed by a computer processor configured to:
store an Address Resolution Protocol (ARP) table and a routing protocol table in one or more memory units;
receive, from the routing protocol table, an Internet Protocol (IP)-Media Access Control (MAC) address pair for a first host computer; and
populate the ARP table with the IP-MAC address pair for the first host computer;

wherein a routing protocol comprises a protocol that allows switches to share network topology information between themselves;
wherein the logic is further configured when executed to:
receive an ARP query from a second host computer, the ARP query requesting, the MAC address for the first host computer; and
based on the ARP table, transmit the MAC address for the first host computer to the second host computer;
wherein the logic is executed by one or more processors of an access switch, the first host computer being a different component from the access switch and the second host computer connected to the access switch;
wherein the routing protocol comprises one of Intermediate System to Intermediate System (IS-IS) routing protocol, Interior Gateway Routing Protocol (IGRP), Enhanced Interior Gateway Routing Protocol (EIGRP), Open Shortest Path First (OSPFh and Routing Information Protocol (RIP); and
wherein the one of more processors only receive IP-MAC address pairs, from the routing protocol, for one or more host computers that are coupled to a particular subset of network segments.

10. The logic of claim 9, wherein the logic is further configured when executed by a computer processor to populate the routing protocol table stored in the one or more memory units with the IP-MAC address pair for the first host computer.

11. The logic of claim 9, wherein the second host computer is connected to a second access switch.

12. The logic of claim 9, wherein the logic is further configured when executed by a computer processor to:
receive, from the routing protocol table, an updated IP-MAC address pair for the first host computer; and
populate, the ARP table with the updated IP-MAC address pair for the first host computer.

* * * * *